United States Patent
Poissant

(10) Patent No.: US 8,015,915 B2
(45) Date of Patent: Sep. 13, 2011

(54) WINE FERMENTATION VESSEL WITH LEES CONTAINMENT APPARATUS

(75) Inventor: Philip L. Poissant, Toronto (CA)

(73) Assignee: Global Vintners Inc., St. Catharines, Ontario (CA)

( * ) Notice: Subject to any disclaimer, the term of this patent is extended or adjusted under 35 U.S.C. 154(b) by 855 days.

(21) Appl. No.: 11/957,937

(22) Filed: Dec. 17, 2007

(65) Prior Publication Data

US 2008/0145479 A1    Jun. 19, 2008

Related U.S. Application Data

(60) Provisional application No. 60/875,182, filed on Dec. 15, 2006.

(51) Int. Cl.
*C12G 1/00* (2006.01)

(52) U.S. Cl. .............. 99/277.1; 426/12; 426/15

(58) Field of Classification Search ............ 426/12, 426/15; 99/277.1, 277, 349; 125/15
See application file for complete search history.

(56) References Cited

U.S. PATENT DOCUMENTS

| | | |
|---|---|---|
| 36,478 A | 9/1862 | Phelps |
| 1,183,048 A | 5/1916 | Terney |
| 193,508 A | 10/1919 | Van Meter |
| 1,381,598 A | 6/1921 | Stoll |
| 1,815,501 A | 7/1931 | Francis et al. |
| 3,076,574 A * | 2/1963 | Woodbury, Jr. ............ 215/11.1 |
| 3,115,149 A | 12/1963 | Tonna et al. |
| 3,115,150 A | 12/1963 | Sariotti et al. |
| 3,301,660 A | 2/1967 | Haag |
| 3,565,102 A | 9/1967 | Doremus et al. |
| 3,431,936 A | 3/1969 | Doremus et al. |
| 3,455,327 A | 7/1969 | Doremus et al. |
| 3,467,132 A | 9/1969 | Parisi |
| 3,519,014 A | 7/1970 | Doremus et al. |
| 3,570,091 A | 3/1971 | Doremus et al. |
| 3,766,711 A | 10/1973 | Lucas |
| 4,164,902 A | 8/1979 | Maarleveld |
| 4,821,764 A | 4/1989 | Brenez |
| 3,476,138 A | 11/1989 | Doremus et al. |
| 5,020,679 A * | 6/1991 | Signorini ............... 215/11.1 |
| D489,930 S * | 5/2004 | Tse ............... D7/306 |
| 2008/0102160 A1* | 5/2008 | Snell et al. ............... 426/15 |

FOREIGN PATENT DOCUMENTS

| | | |
|---|---|---|
| CA | 2227023 | 9/1999 |
| JP | 09308385 A * | 12/1997 |
| WO | WO 2005051150 A1 * | 6/2005 |

* cited by examiner

*Primary Examiner* — Henry Yuen
*Assistant Examiner* — Jianying Atkisson
(74) *Attorney, Agent, or Firm* — Mark S. Leonardo; Lillian R. Horwitz; Brown Rudnick LLP

(57) ABSTRACT

There is provided a fermentation apparatus that allows the separation of a wine, beer or other brewed or fermented beverage from its lees using a single container. The vessel can be used in wine making operation and is constructed so that the lees that settle out during fermentation may be mechanically trapped at the bottom of the vessel and the wine then removed, typically through a spigot, without contamination by the entrapped lees.

47 Claims, 8 Drawing Sheets

WINE FERMENTATION VESSEL WITH LEES CONTAINMENT APPARATUS

RELATED APPLICATION

This application claims the benefit under Title 35, U.S.C., S.119(e) of U.S. provisional application No. 60/875,182 filed Dec. 15, 2006.

FIELD OF INVENTION

The present invention relates generally to fermentation devices and methods for the making of wine, beer and other brewed or fermented beverages. One application is in apparatus and methods for producing wine and isolating lees and other sediment from the wine.

BACKGROUND OF INVENTION

Basic winemaking comprises combining winemaking ingredients in a fermentation vessel. The mixture is left to ferment undisturbed for a period of time during which unwanted sediment know as "lees" settles. Prior to consumption, the wine must be separated from its lees. Typically, the wine is separated from the lees by siphoning the liquid, using a hose, from one container to another, leaving the lees behind. The siphoned liquid may then be passed through a filter to ensure that any lees that is stirred up in the siphoning process does not contaminate the wine that is ready for the next step in the particular winemaking process.

A substance such as Bentonite, activated carbon or other suitable clarifying agents may be introduced to the liquid to encourage further sediment to form during a process known as fining. The liquid may then undergo a second fermentation period. After this secondary fermentation period, the liquid is ready for bottling, or for another fermentation period.

U.S. Pat. No. 3,760,711, issued in the name of Webster, discloses an apparatus comprising two plastic bag containers having a fitting adapted to accommodate a tube to siphon the liquid from one container to the other using gravitational feed.

There are also several known fermentation tanks that are modified to separate the wine from its lees without the need of a siphoning tube. U.S. Pat. No. 4,164,902 issued in the name of Maarleveld, discloses a wine fermentation container that filters the lees from the wine as the wine flows out of the container into a second container. The container has an inverted frusto-conical shaped bottom section and a bottom discharge opening. A filter is positioned within the tank just above the bottom discharge opening. The filter is sealingly engaged at its lower edge with the frusto-conical shaped bottom section to retain the lees as the wine flows out of the container into a second container.

Canadian Patent No. 2,227,023, issued in the name of Barrios, discloses a fermentation container that allows the removal of the lees and leaves the wine behind in the fermentation container. The container has an inverted frusto-conically shaped bottom that leads to a valve that has an outlet that is sufficiently large to allow the lees to pass through. After the concentrated juice is left to ferment and the lees is allowed to settle at the bottom of the container, the valve is opened and the lees carried by a portion of the wine that flows out the bottom of the container and into a waste container. Once the last of the lees flows from the container, the valve is closed and the remaining wine is left in the container.

SUMMARY OF INVENTION

An object of the invention is to provide a fermentation apparatus that allows the separation of a wine, beer or other brewed or fermented beverage from its lees using a single container.

The invention comprises the provision of a fermentation vessel in which lees that settles out during fermentation may be mechanically trapped at the bottom of the vessel and the wine then removed, typically through a spigot, without contamination by the entrapped lees. Suitably the lees is caused to collect at the bottom of the vessel by providing a vessel the walls of which are smooth to prevent adherences of lees and are angled at most at a relatively small angle to the vertical, again to enhance settling of the lees without adhesion to the walls. After settling, a lees containment member is inserted into the fermentation vessel to settle over the settled lees in a sealing engagement with at least the outer wall of the vessel. When used, a spigot is located mounted flush with the interior of the vessel wall at a level just above the final resting level of the lees containment member.

A fining process may be undertaken to remove fine particles from the wine which otherwise cause a lack of clarity in the wine. The fines are agglomerated by an additive and settle to the bottom of the vessel above the lees containment member. A fines containment member is then introduced to trap the fines below it. In that case the spigot is located above the final resting place of the fines containment member.

According to one aspect of the present invention, there is provided a fermentation vessel having a bottom and at least one outer wall extending upwardly and outwardly from the bottom at an angle such that at least a substantial part of the sediment or lees will not adhere to the wall but will fall to the bottom of the vessel. A lees containment member is configured such that it may be inserted into said outer container. The inner part has a bottom and a lees containment surface, the periphery of which matches the cross-section of the vessel at a plane spaced a predetermined distance from the bottom of the vessel. Typically, a seal is positioned around the periphery for sealing engagement with the at least one outer wall at the plane to form a lees containment space below the seal when the lees containment member is inserted into the vessel. The vessel includes a cover for sealable attachment to the top of the vessel. An air lock is insertable into the cover, permitting gas to escape the vessel, but not allowing gas to enter. The cover may also comprise a cap comprising a handle for transport of the vessel.

According to another aspect of the present invention, there is provided a fermentation vessel having a bottom, at least one outer wall extending upwardly and outwardly from the bottom at an outward angle sufficient that at least a substantial part of the sediment or lees will not adhere to the wall but will fall to the bottom of the vessel, and at least one inner wall extending upwardly and inwardly at an angle within said vessel to define an annular space between said inner and outer walls. A lees containment member is configured for insertion into the annular space within the vessel. The lees containment member has a bottom containment surface. The periphery of the bottom containment surface matches the cross-section of the vessel at a plane spaced a predetermined distance from the bottom of the vessel. Typically, there is a seal around the periphery for sealing engagement with said outer wall at said plane, when said lees containment member is inserted into annular space. The vessel includes a cover for sealable attachment to the top of the vessel. An air lock is insertable into the cover, permitting gas to escape the vessel, but not allowing gas to enter. The cover may also comprise a cap comprising a handle for transport of the vessel.

According to another aspect of the present invention, there is provided a fermentation vessel having a bottom, at least one outer wall extending upwardly and outwardly from the bottom at an outward angle sufficient that at least a substantial part of the sediment or lees will not adhere to the wall but will fall to the bottom of the vessel, and at least one inner wall extending upwardly and inwardly at an angle within said vessel to define an annular space between said inner and outer walls. A lees containment member is configured for insertion into the annular space within the vessel. The lees containment member has a first bottom containment surface. The periphery of the first bottom containment surface matches the cross-section of the vessel at a plane spaced a predetermined distance from the bottom of the vessel. Typically, there is a seal around the periphery for sealing engagement with said outer wall at said plane, when said lees containment member is inserted into said annular space. A fines containment member is configured for insertion above the lees containment member to define a fines containment space between a bottom of said fines containment member and the lees containment member. The periphery of the fines containment member matches the cross-section of the vessel at a second plane space a predetermined distance from the bottom of the vessel. Typically, there is a seal around the periphery of the second containment surface for sealing engagement at the second plane. At a predetermined distance from the top of the lees containment member, the lees containment member flares outwardly forming a fining overflow space. The vessel includes a cover for sealable attachment to the top of the vessel. An air lock is insertable into the cover, permitting gas to escape the vessel, but not allowing gas to enter. The vessel also includes a handle for transport of the full or empty vessel.

A turntable assembly for rotatable engagement with the bottom of the fermentation vessel may also be provided. The turntable comprises a table and a base portion, configured to provide at least one stop to limit the degree of rotation of the table relative to the base, in order to facilitate removal of sediment.

A spigot assembly in the fermentation vessel at a level at least above the lees containment surface or fines containment space may also be provided.

According to another aspect of the present invention, there is provided a method for use of the apparatus, described in terms of making wine. The necessary ingredients are placed in the vessel and a cover and air lock are secured in place. The ingredients are left to ferment for a sufficient time to complete or substantially complete the fermentation process. At this time, most of the lees will have settled out of the ingredients into the lees containment space. The vessel may be placed on the turntable assembly and turned until it hits a stop, dislodging any lees which may have adhered to the side of the vessel. Once the lees is gathered at the bottom of the vessel, the lees containment member is inserted, sealing off the lees.

The method of using the container may also include adding a suitable fining material to the winemaking ingredients, allowing the fines to settle out of the winemaking ingredients as well. Once the fines have settled out and collected in a lees containment space, a fines containment member is inserted and allowed to drop into place to contain the fines, sealing off the fines.

While the present invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the present patent specification as a whole. Further it will be understood that all dimensions and sizes described herein, both relative and absolute, may be varied within a broad range to provide a fermentation vessel that will satisfy a given desired use. For example, it is contemplated that the size of the vessel may be increased to provide a sufficient enough volume of wine to make a commercial quantity of wine. As well, the materials described herein are merely intended to be illustrative and are subject to a range of suitable alternatives.

BRIEF DESCRIPTION OF THE DRAWINGS

These and other advantages of the present invention will become apparent upon reading the following detailed description and upon referring to the drawings in which.

DETAILED DESCRIPTION OF THE PREFERRED EMBODIMENTS

Figure 1:
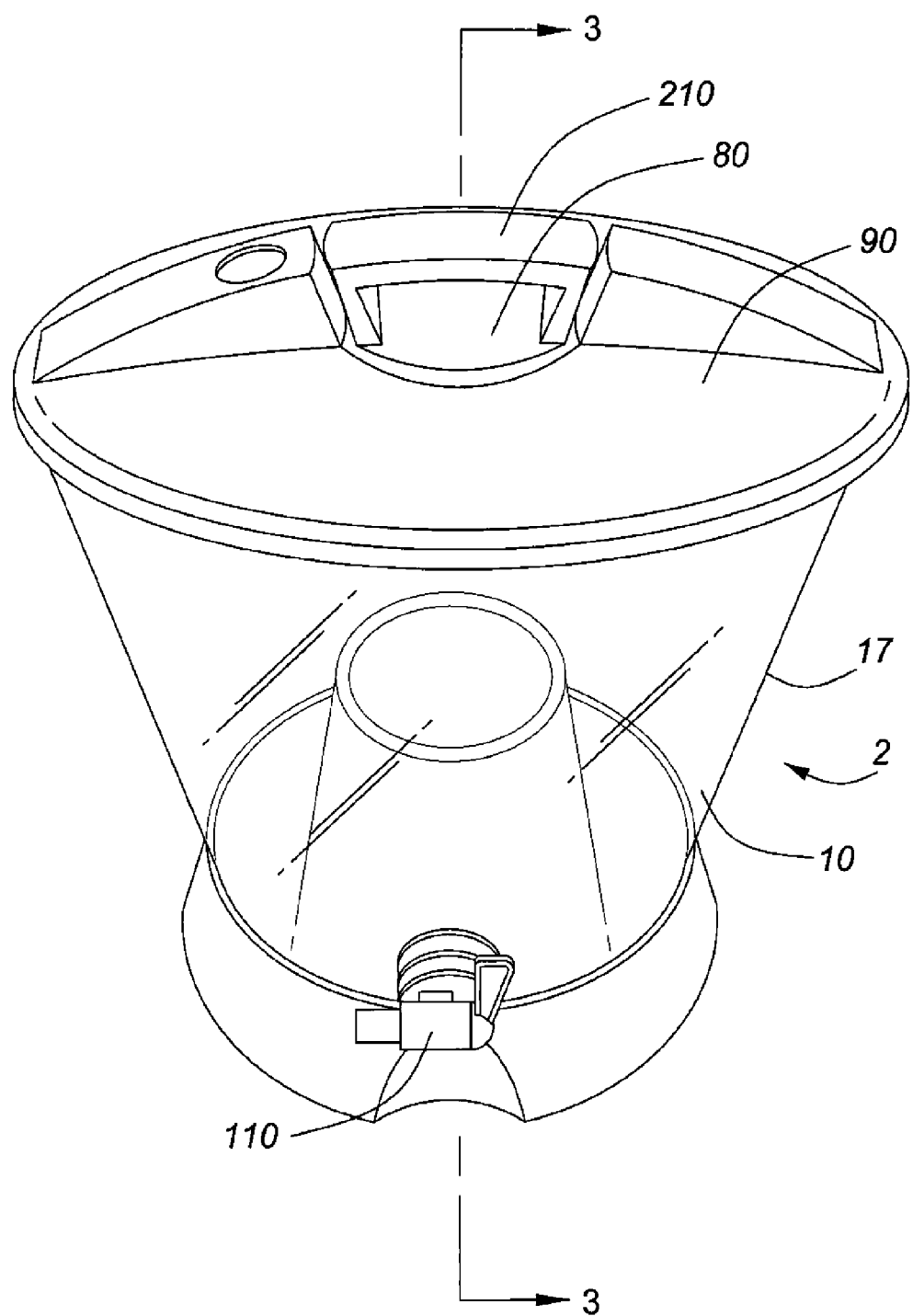
FIG. 1 is a perspective view of an assembled embodiment of the fermentation vessel.

In the following description, similar features in the drawings have been given identical reference numerals where appropriate. All dimensions described herein are intended solely to illustrate an embodiment. These dimensions are not intended to limit the scope of the invention that may depart from these dimensions.

Figure 2:
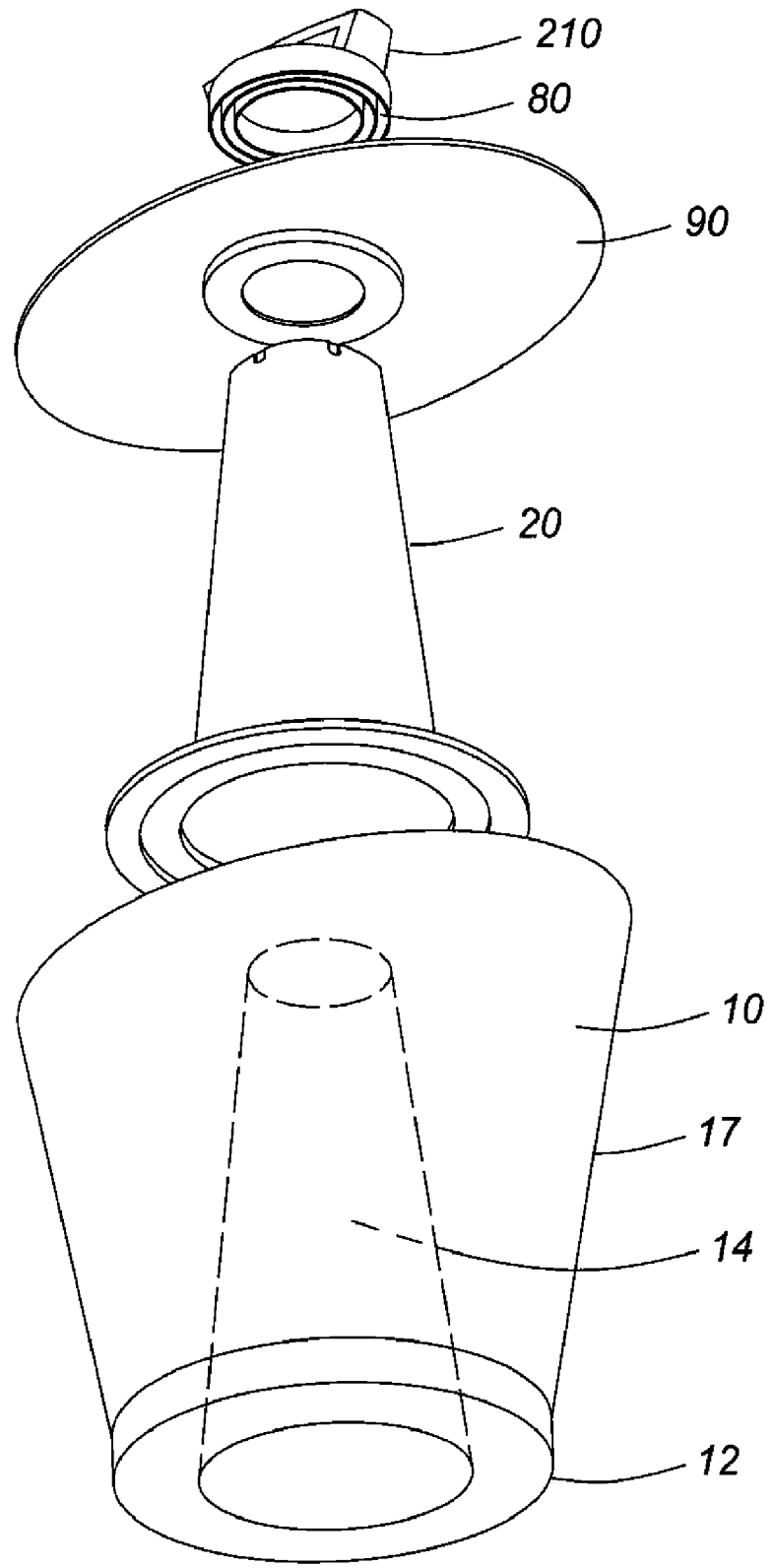
FIG. 2 is an exploded view of a further embodiment of the fermentation vessel

FIGS. 1 and 2 illustrate a fermentation vessel 2, such as a type suitable for home wine making operations, that embodies the present invention. Although the invention has been illustrated for use in a wine making fermentation vessel, it is contemplated that the principles of the invention can be practiced in other fermentation type vessels, or other vessels for making brewed beverages.

Figure 3:
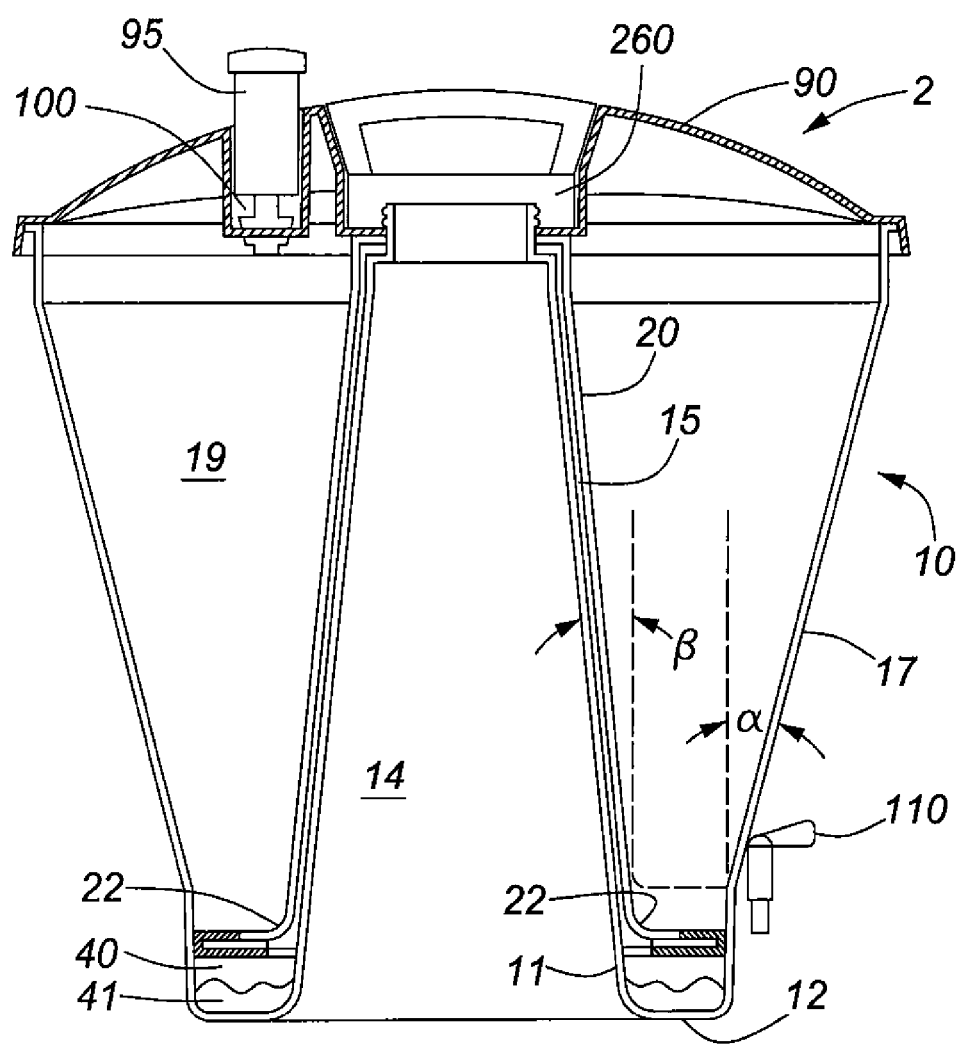
FIG. 3 is a vertical cross-section of an embodiment of the fermentation vessel.
Figure 4:
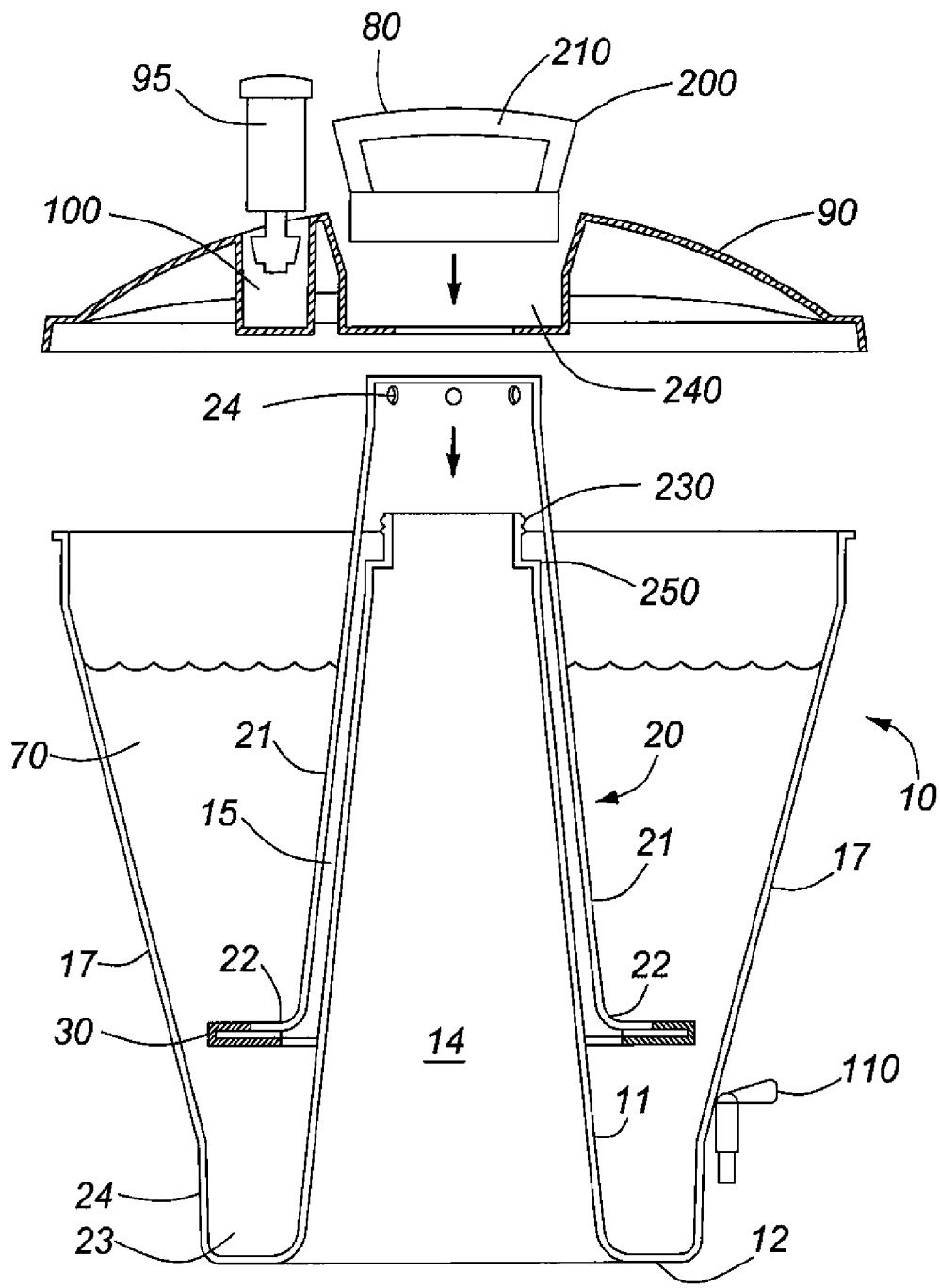
FIG. 4 is an exploded view of a further embodiment of the fermentation vessel.

Turning to FIGS. 3 and 4, there is illustrated a fermentation vessel according to the present invention having a container 10 having a bottom 12 and at least one outer wall 17 extending upwardly and outwardly from the bottom 12 at an outward angle α. The outer wall 17 is sloped sufficiently to allow the lees to sediment at the bottom of the outer container 10 without sticking to the outer wall 17. By way of example, the outer wall 17 is sloped at an angle α of about 1°-20° to the vertical for optimization. The outer container 10 may have a centrally located inner wall 11 extending upwardly and inwardly from the bottom 12 at an angle β. By way of example, the inner wall 11 is sloped at an angle β of 0°-6° to the vertical. The inner wall 11 may form a hollow interior space 14 and may comprise a central hollow cone.

The inner 11 and outer 17 walls thus define an annular containment space 19 between them.

A bottom section 23 of container 10 may have a circular cross section. The part 24 of wall 17 which defines lower section 23 may be at a significantly steeper angle to the vertical than the angle α. Container 10 may flare above lower section 23 to form an elliptical annular space.

A lees containment member 20 is dimensioned to be inserted into the container 10. Where the container 10 comprises an annular space, the lees containment member 20 is dimensioned to drop into the annular space. The member 20 has a bottom lees containment surface 22, the periphery of which matches the cross-section of the container 10 at a plane spaced a predetermined distance from the bottom 12. The pre-determined space is sufficiently large to contain the volume of lees 41 that would be produced by the volume of grape juice (here and throughout grape juice is intended also to include grape juice concentrate and/or crushed grapes) that may be accommodated by the size of the outer container 10. By way of example, one embodiment has a lees containment area that is between 200-400 ml in volume for a juice volume of approximately 10 L. A seal 30 that is attached around the periphery of the bottom of the lees containment surface 22 is dimensioned to engage the outer wall 17 at the pre-determined distance when the lees containment member 20 is inserted into the outer container 10. The seal 30 may be made of any suitable material, such as food grade neoprene, rubber, plastic, polymer, or metal that can withstand the conditions that arise during the process of fermenting a wine, beer or other fermented beverage.

The lees containment member 20 typically has at least one wall 21 extending upwardly from the bottom containment surface 22 and is dimensioned to slide over the inner wall 11. As the lees containment member 20 is inserted, the fit is sufficiently loose that an air gap 15 is formed between the inner wall 11 and the wall of the lees containment member wall 21. The air gap 15 is suitably dimensioned to allow fermentation gasses generated in the lees containment area 40 to escape. By way of example, a typical embodiment has an air gap 15 that is 0.125 inches in width. However, it is contemplated that a smaller or larger air gap may be suitable so long as the air gap is sufficiently large to allow gas to escape and prevent the buildup of excess pressure in the lees containment area 40. Furthermore, the air gap 15 may not extend over all of the area between the said walls but need only be sufficient to allow escape of gases as noted above.

Escape holes 24 for the generated gas are located near the top of the lees containment member 20 and are positioned so that they are above the top surface of the grape juice 70 and in communication with the air gap 100.

A spigot 110 may be mounted above the lees containment surface 22 so that liquid may be taken from the outer container 10 without contamination by the lees. It is also contemplated that the spigot 110 may take the form of any type of suitable valve that has a setting to allow fluid to flow from the container through the valve and a setting to prevent the flow of fluid.

For optimal performance, the spigot assembly is mounted flush with the inside surface 111 of container 10, so that no inwardly protruding surface or outwardly protruding opening interrupts the fall of lees to the lees containment space.

A top cover 90 fits over the top of the outer container 10 for removable attachment to the outer container 10. The top cover is dimensioned to form a fluid tight seal around the periphery of the outer container 10 when in place. As shown in FIG. 1, the cover 90 may be temporarily attached in place with a locking device 80. However, it is contemplated that the top cover 90 may be dimensioned to form a frictional fit between the periphery of the outer container 10 and the inside rim of the top cover 90. The top cover 90 is preferably dome shaped to ensure that the air space 100 is maintained above the top level of the grape juice 70. The air space 100 is created to supply the yeast with enough ambient oxygen to ferment the grape juice 70 to wine. Preferably, the volume of the air space is at least 15% of the total volume of the outer container 10. As shown in FIG. 4, a one way valve or air lock 95 may be mounted on the top cover 90 so that it is in communication with the air space 100 when the top cover 90 is mounted on the outer container 10.

The cover 90 may also include an opening 240 for a cap 200. The cap 200 includes a depression 260 capable of insertion over the top of the inner wall 11. Preferably, the top of the inner wall 11 includes threads 230 and the depression 260 includes corresponding threads capable of securing the cap 200 to the top of the inner wall 11. The opening 240 is dimensioned so that the cover 90 rests on top of the lees containment member 20 when the vessel components are assembled. The cap 200 may then be screwed onto to the inner wall 11. A fluid and airtight seal is formed between the bottom of the cap 200 and the periphery of the opening 240. The cap may also include a handle 210 capable of transporting a full or empty vessel 10.

Figure 5:
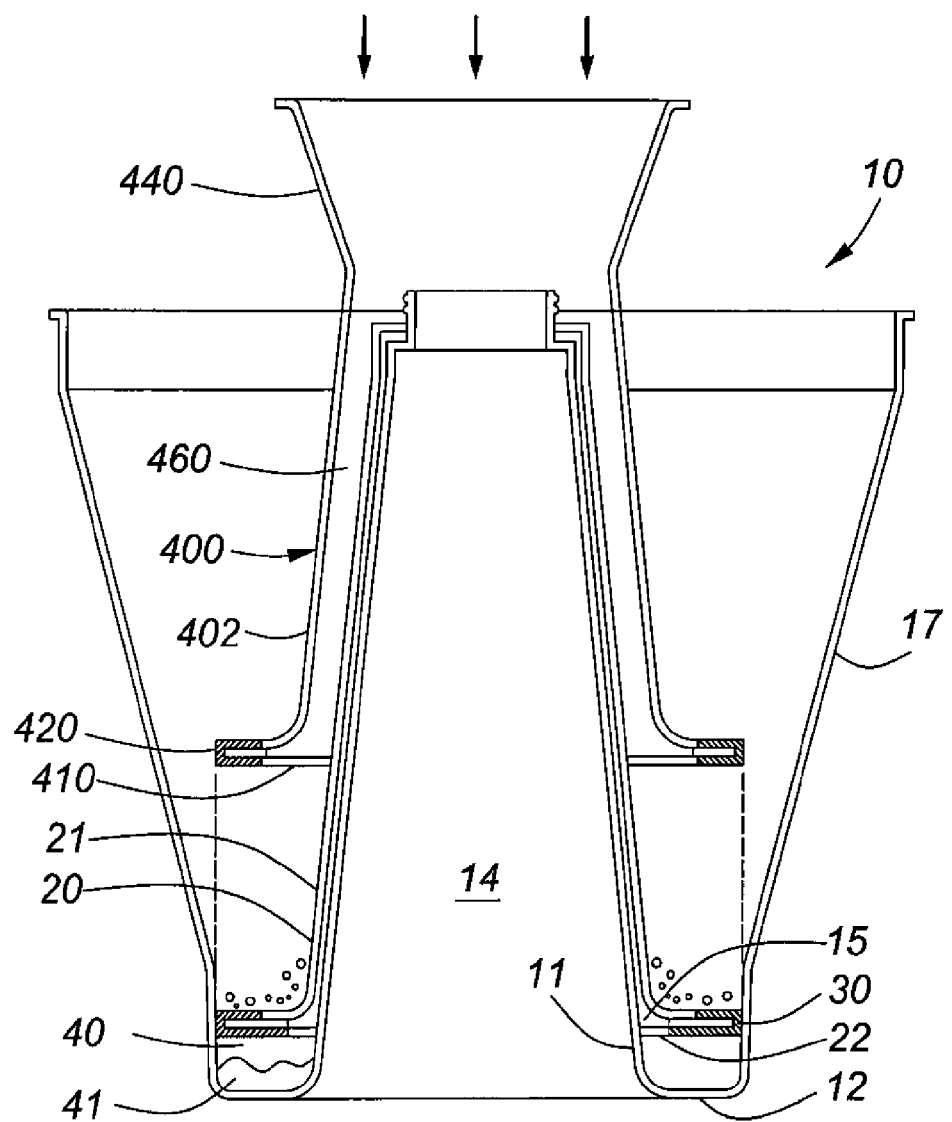
FIG. 5 is an exploded view of the embodiment of FIG. 4.

Turning to FIGS. 4 and 5, there is illustrated the interaction of the lees containment member 20 with the outer container 10. After a fermentation process is complete or substantially complete, and the lees 41 has substantially settled to the lees containment space 40, the lees containment member 20 is lowered into the container 10 and over the inner wall 11. The lees containment member 20 is lowered until the bottom containment surface 22 engages the sides of the outer container 10 at a pre-determined distance from the bottom 12 to define the lees containment space 40.

A further embodiment of the present invention comprises a fines containment member 400 dimensioned to be inserted into the container 10. The fines containment member 400 has a bottom fines containment surface 410, the periphery of which matches the cross-section of the outer container 10 at a predetermined distance from the bottom 12, defining a fines containment space 430. The fines containment space 430 is sufficiently large to contain the volume of fines 431 that would be found in the volume of grape juice 70 that may be accommodated by the size of the outer container 10. Typically, a seal 420 is included around the periphery of the fines containment surface 410 and is dimensioned to engage the outer wall 17 at the pre-determined distance when the fines containment member 400 is inserted into the outer container 10. The seal 420 may be made of any suitable material, such as food grade neoprene, rubber, plastic, polymer, or metal that can withstand the conditions that arise during the process of fermenting a wine, beer or other fermented beverage.

The fines containment member 400 has at least one wall 402 extending upwardly from the fines containment surface 410 and is dimensioned to slide over the upwardly extending wall 21 of the lees containment member 20. As the fines containment member 400 is inserted, a gap 460 is formed between the wall 21 and the wall 402. The gap 460 is suitably dimensioned to allow any excess liquid containing fines to escape the fines containment space 430.

The fines containment member 400 may comprise an outwardly flaring top portion 440, forming an overflow container 450. The overflow container 450 is in fluid communication with the fines containment space 430 via the gap 460. The overflow container 450 is suitably dimensioned to contain the grape juice containing fines, preventing it from flowing into the grape juice 70.

Figure 6:
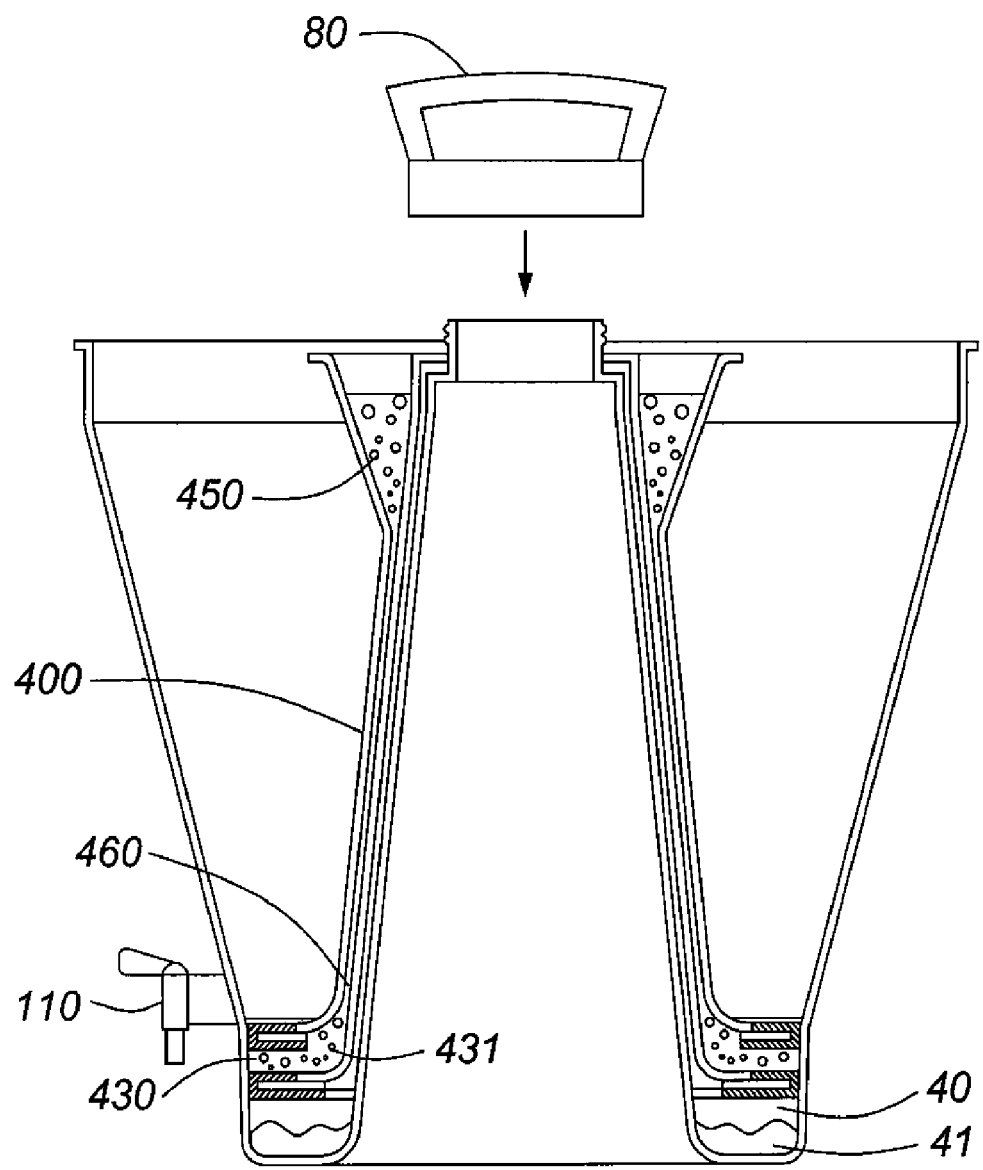
FIG. 6 is a view of a further embodiment of the fermentation vessel.

Also in FIG. 6 there is illustrated the interaction of the fines containment member 400 with the outer container 10 and the lees containment member 20. The fines containment member 400 is lowered into the container 10 and over the inner wall 20. The fines containment member 400 is lowered until a fines containment surface 410 engages the sides of the outer container 10 at a predetermined distance from the bottom 12 to define a fines containment space 430. Any surplus juice 70 is displaced upwards to the overflow container 450.

A spigot 110 may be mounted above the fines containment space 430 so that it is in fluid communication with the inside of the outer container 10. It is also contemplated that the spigot 110 may take the form of any type of suitable valve that has a setting to allow fluid to flow from the container through the valve and a setting to prevent the flow of fluid.

Figure 7A:
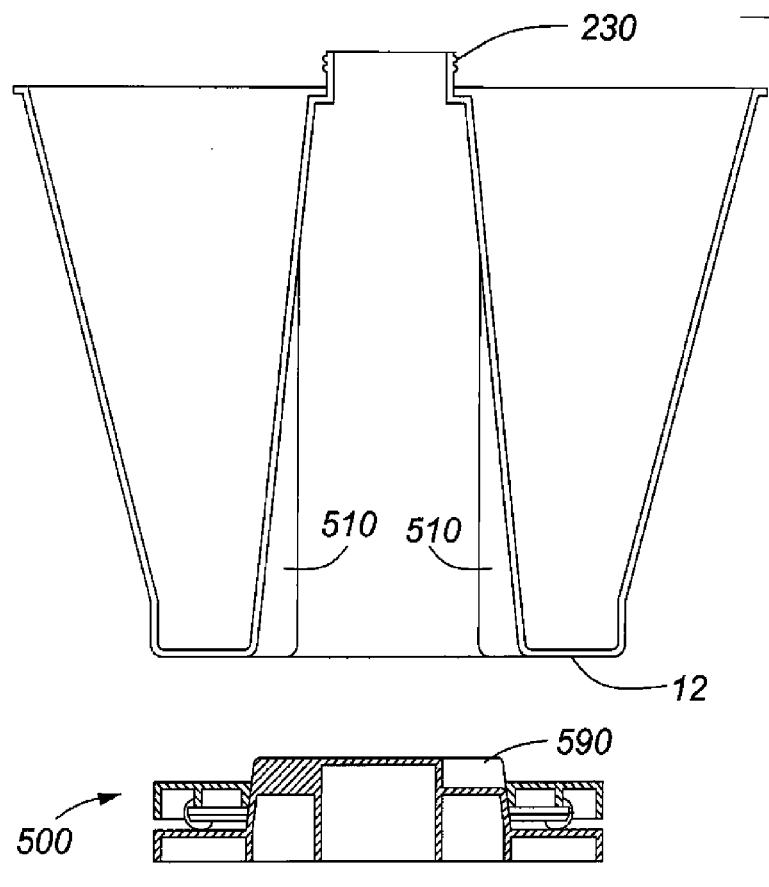
FIG. 7*a* is a view of an embodiment of the invention incorporating a turntable assembly (shown in section) for use with the fermentation vessel.
Figure 7B:
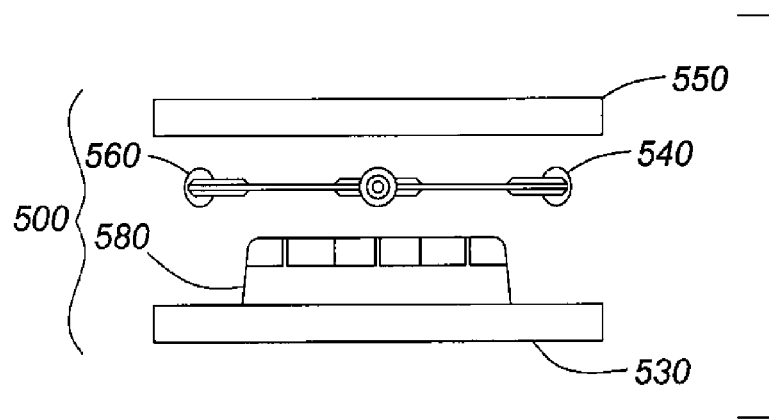
FIG. 7*b* is an exploded view of the turntable assembly.
Figure 8:
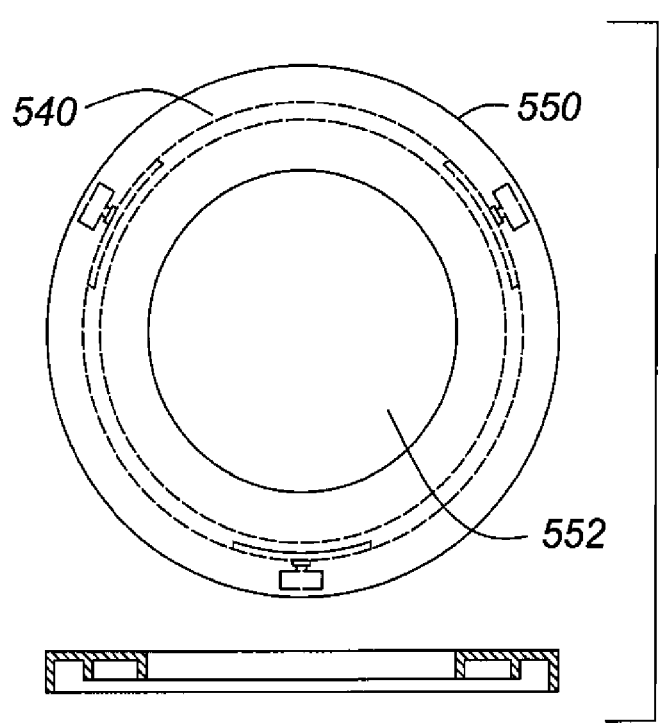
FIG. 8 is a top view and partial sectional view of the table member of the turntable assembly in FIG. 7*a*.
Figure 9:
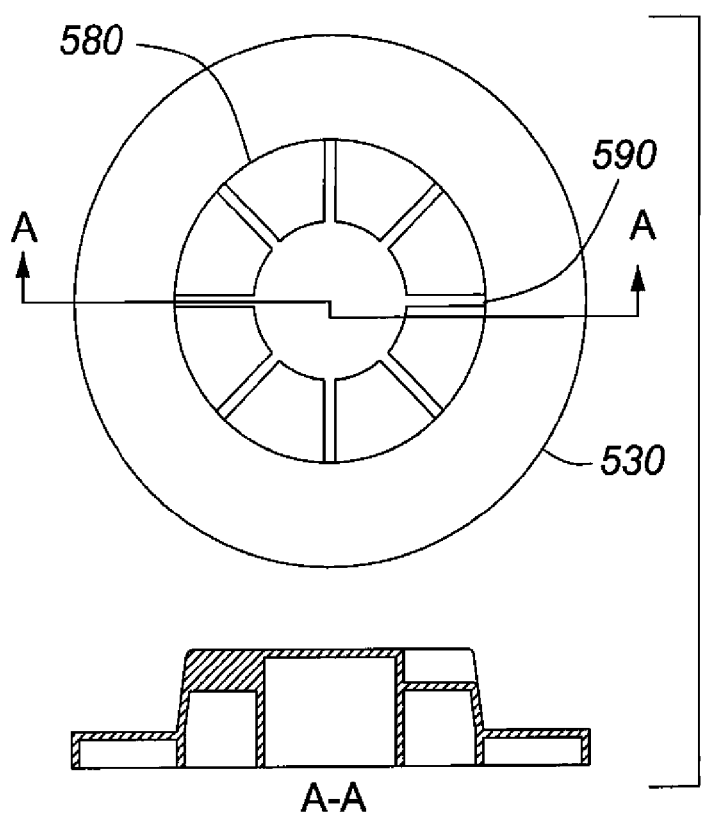
FIG. 9 is a top view and partial sectional view of a base member component of turntable assembly in FIG. 7*b*.

Turning to FIGS. 7 to 9, a further embodiment of the present invention comprises a turntable assembly 500 capable of engaging with the bottom 12. The turntable assembly 500 is formed from a base member 530, and a table member 550 rotatable relative to each other. The base member 530 includes an upwardly extending central part 580. In one embodiment, a rotational component 540 is configured to fit over the central part 580 and rests on the base member 530. The rotational component 540 may be of a three-wheeled microwave style turntable design. The table 550 is configured with a central opening 552 to receive the central part 580. The table 550 is placed over the rotational component 540, hiding the rotational component 540 from view. The table 550 is capable of supporting the weight of the vessel 10.

The central part 580 comprises at least one stop 590 extending radially within opening 552. As well, the inner body 11 further comprises at least one fin 510 extending partially into the interior space 14 capable of engaging the stop 590 when the vessel 10 is turned. Typically the arrangement includes multiple stops 590 separated by an angular distance defining the maximum permitted rotation of table 550 relative to base member 530.

The method of use of the apparatus will be described in terms of a winemaking process. The necessary winemaking ingredients, including fruit juice, typically grape juice, yeast and, selectively, other additives, are placed in the container 10 and the cover 90 is secured in place. The air lock 95 is also secured in place. The juice is then left to ferment for a sufficient time to complete or substantially complete the fermentation process. In the course of fermentation, the lees in large part settles out of the juice into the lees containment space 40.

To ensure that no lees has adhered to the inner or outer walls 15 or 17, the vessel 10 can be placed on turntable assembly 500 and rotated through the permissible degrees of angular rotation. When a fin 510 brings up against a stop 590, the minor shock on container 10 is sufficient to dislodge any lees which may have adhered.

Once the lees is gathered in space 40, cover 90 is removed and lees containment member 20 inserted. Seal 30 brings up against the inner surface of wall 17 to contain lees 40.

If the wine is to be fined, a suitable fining material is added to agglomerate the fines, such that the agglomeration settles out and comes to rest on the upper side of the lees containment surface. Once the fines have settled out, the fines containment member 400 is inserted into the container 10 and allowed to drop into place to contain the fines. Seal 420 comes into sealing contact with the wall 17. Seals 30 and 420 are typically flexible to enable a good seal to be made.

As the lees 41 and fines 431 are suitably contained, the wine resulting from the fermentation of the juice is free to be removed from the vessel via the spigot, to be bottled or stored as appropriate.

Although the present invention has been described by way of a detailed description in which various embodiments and aspects of the invention have been described, it will be seen by one skilled in the art that the full scope of this invention is not limited to the examples presented herein. For example, the fermentation vessel may be suitable to brew any fermented liquid for consumption, including but not limited to beer, wine or other spirit. The invention has a scope which is commensurate with the claims of this patent specification including any elements or aspects which would be seen to be equivalent to those set out in the accompanying claims.

What is claimed is:

1. A fermentation apparatus comprising:
   (a) a container having a bottom, an outer wall extending upwardly from said bottom, at least a major part of said wall flaring outwardly at a predetermined angle relative to the periphery of said bottom, and an inner wall extending upwardly from said bottom and defining an annular space between said outer and inner wall;
   (b) a first insert for insertion into said annular space to a peripheral engagement with an inner surface of said outer wall at a first horizontal plane, said first insert comprising a bottom containment surface and at least one wall extending upwardly therefrom and dimensioned to fit over said inner wall; and
   (c) a seal between the periphery of the bottom of said first insert and said inner surface of said outer wall at or adjacent said first horizontal plane for defining a lees containment space at the bottom of said container below said first horizontal plane and a liquid containment space above said first horizontal plane.

2. The fermentation apparatus of claim 1 wherein said seal is fixed to said periphery of said first insert.

3. The fermentation apparatus of claim 2 wherein said seal is flexible.

4. The fermentation apparatus of claim 1 wherein said outer wall includes a lower part between said bottom and said first horizontal plane and said major part flaring outwardly at said first predetermined angle above said first horizontal plane, wherein said lower part extends upwardly from said bottom at an angle between the outer wall and the bottom wall, said angle being less than said first predetermined angle.

5. The fermentation apparatus of claim 4 wherein said bottom is circular.

6. The fermentation apparatus of claim 5 wherein the cross section of said flaring major part is elliptical.

7. The fermentation apparatus of claim 1 wherein said bottom is circular and said wall flares upwardly from said bottom.

8. The fermentation apparatus of claim 7 wherein the cross section of said container above said bottom is elliptical.

9. The fermentation apparatus of claim 7 wherein the cross section of said container from said bottom to said first horizontal plane is circular and above said plane is elliptical.

10. The fermentation apparatus of claim 1 further comprising at least one gas vent for venting gas from said lees containment space.

11. The fermentation apparatus of claim 10 wherein said at least one gas vent comprises at least one channel from said lees containment space to an outlet proximate the top of said container.

12. A fermentation apparatus comprising:
(a) a container having a bottom, at least one outer wall having a first lower part and second upwardly flaring part, said flaring part being angled such that lees or sediment in a fermenting liquid in said container is permitted to fall to the bottom of said container without adherence to said at least one outer wall;
(b) said container having at least one inner wall extending upwardly from said bottom and defining a generally annular space between said inner and outer walls;
(c) an insert for inserting into said annular space in said container, said insert having a bottom lees containment surface and an upstanding part dimensioned to fit over said inner wall, the periphery of said bottom lees containment surface conforming to the interior surface of said outer wall at a horizontal plane spaced a predetermined distance from said bottom; and
(d) a seal around said periphery for sealing contact between said periphery and the inner surface of said outer wall proximate said horizontal plane, when said insert is inserted into said container to form a lees containment space below said bottom lees containment surface and a liquid containment space above said bottom lees containment surface.

13. The fermentation apparatus of claim 12 wherein said upstanding part of said insert fits loosely over said inner wall to permit gas to vent from said lees containment space.

14. The fermentation apparatus of claim 12 wherein said inner wall of said container and said upstanding part of said insert comprise truncated cones.

15. The fermentation apparatus of claim 12 wherein said bottom is of circular cross section.

16. The fermentation apparatus of claim 12 wherein said second part of said container is circular in cross section.

17. The fermentation apparatus of claim 12 wherein said flaring part of said outer wall is elliptical in cross section.

18. The fermentation apparatus of claim 12 wherein said angle of said flaring part is in the range of about 70° to about 89°.

19. The fermentation apparatus of claim 18 wherein said angle is about 84°.

20. The fermentation apparatus of claim 12 wherein said container includes a cover which is selectively securable on said container.

21. A fermentation apparatus comprising:
(a) a container comprising a bottom, a first outer wall upstanding from the periphery of said bottom, said first outer wall extending from said bottom to a horizontal plane a predetermined distance above said bottom, a second outer wall part flaring upwardly and outwardly above said horizontal plane, and an inner wall extending upwardly to a position proximate the top of said container to thereby form a first upstanding part to define a substantially annular space between said outer and inner walls;
(b) a first insert for insertion into said annular space, said first insert having a bottom containment surface, a first circumference of which is not less than that of said container at said horizontal plane, such that the periphery of said first insert brings up against an interior surface of said outer wall at or adjacent said horizontal plane, when said first insert is inserted into said container, and at least one wall extending upwardly from the bottom containment surface dimensioned to fit over said inner wall; and
(c) a seal around said periphery of said first insert for sealing contact between said periphery and the interior surface of said outer wall proximate said horizontal plane to define therebelow a lees containment space and thereabove a liquid containment space.

22. The fermentation apparatus of claim 21 wherein said first insert further comprises a second upstanding part which fits over said first upstanding part of said container when said first insert is inserted into said container.

23. The fermentation apparatus of claim 22 wherein said first upstanding part and said second upstanding part are in the shape of truncated cones.

24. The fermentation apparatus of claim 21 further comprising at least one gas vent for venting from said lees containment space.

25. The fermentation apparatus of claim 22 wherein said second upstanding part of said first insert fits loosely over said first upstanding part of said inner wall of said container, whereby gas may be vented from said lees containment space, through space between said second upstanding part and said inner wall.

26. The fermentation apparatus of claim 22 further comprising at least one gas vent between said second upstanding part and said first upstanding part of said inner wall for venting gas from said lees containment space.

27. The fermentation apparatus of claim 22 wherein said interior space comprises an annular space at least at said horizontal plane.

28. The fermentation apparatus of claim 27 wherein said interior space comprises an annular space from said bottom of said container at least upwardly to said plane.

29. The fermentation apparatus of claim 27 wherein the cross section of said container at least at the top thereof is an elliptical annulus.

30. The fermentation apparatus of claim 27 wherein the cross section of said container from a position proximate said horizontal plane to the top of said container is an elliptical annulus.

31. The fermentation apparatus of claim 21 comprising, a turntable assembly for rotatable engagement with said bottom of said container, said turntable assembly comprising a base and a table.

32. The fermentation apparatus of claim 31 wherein said turntable comprises at least one stop for limiting the degree of rotation of said table relative to said base.

33. The fermentation apparatus of claim 32 wherein each said at least one stop comprises structure on said base for engaging said bottom of said container.

34. The fermentation apparatus of claim 33 wherein said structure on said bottom of said container comprises a recess in said bottom having therein at least one first rib protruding radially into said recess; and said structure on said base comprises a series of spaced second ribs extending axially into said recess when said container is placed on said table; whereby when said container is rotated, said at least one first rib is in an interference position with each said second rib during rotation of said container on said table to thereby limit the maximum degree of rotation of said container to the minimum distance between any two said second ribs.

35. The fermentation apparatus of claim 34 wherein said table includes an opening therethrough and wherein said recess and said second ribs are aligned with said opening.

36. The fermentation apparatus of claim 35 wherein said opening is a central opening.

37. The fermentation apparatus of claim 33 further comprising at least two said stops for defining therebetween a degree of rotation of said bottom of said container relative to said base.

38. The fermentation apparatus of claim 33 further comprising a series of said stops equispaced for defining therebetween a degree of rotation of said bottom of said container relative to said base.

39. The fermentation apparatus of claim 22 further comprising a second insert for insertion above said first insert, defining a fines containment space between a fines containment surface on the bottom of said second insert and a top of said lees containment surface of said first insert; and wherein the periphery of said fines containment surface is in contact with the inner surface of said container at a second circumference above said first circumference.

40. The fermentation apparatus of claim 39 wherein said periphery of said bottom of said second insert is in sealing engagement with said inner surface of said container at said second circumference.

41. The fermentation apparatus of claim 39 wherein said second circumference is not less than said first circumference.

42. The fermentation apparatus of claim 39 wherein said second insert further comprises a corresponding third upstanding part which extends over said second upstanding part when said second insert is inserted into said container.

43. The fermentation apparatus of claim 42 wherein said third upstanding part fits loosely over said second upstanding part to thereby form an overflow channel between said second and third upstanding parts.

44. The fermentation apparatus of claim 43 wherein said second insert further comprises an overflow container proximate the top of said third upstanding part.

45. The fermentation apparatus of claim 44 wherein said overflow container is integral with said second insert and comprises a flared top part of said third upstanding part, the inner surface of said flared part and an outer surface of said second upstanding part comprising said overflow container, opened directly to said overflow channel.

46. The fermentation apparatus of claim 39 further comprising a spigot assembly in said container at a level of said container above said fines containment surface when said second insert is fully inserted into said container.

47. The fermentation apparatus of claim 22 further comprising a spigot assembly above said lees containment space.

\* \* \* \* \*